3,089,826
PRODUCTION OF BRONCHODILATOR EFFECTS WITH O - HALO - N,N - DIMETHYLPHENETHYL-
AMINE ACID ADDITION SALTS
Melville Sahyun and John A. Faust, Santa Barbara, Calif.; said Faust assignor to said Melville Sahyun, doing business as Sahyun Laboratories, Santa Barbara, Calif.
No Drawing. Filed Oct. 15, 1958, Ser. No. 767,257
1 Claim. (Cl. 167—84.5)

This invention relates to the acid addition salts of o-halo-N,N-dimethylphenethylamine and is more particularly concerned with the acid addition salts of o-chloro-N,N-dimethylphenethylamine and of o-bromo-N,N-dimethylphenethylamine.

This application is a continuation-in-part of our application Serial No. 686,888, filed September 30, 1957, now abandoned, for "Acid Addition Salts."

The compounds of the present invention have the following formula:

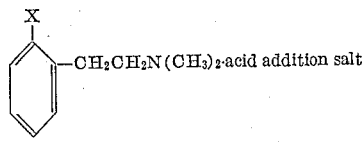

wherein X represents a halogen atom, preferably bromine or chlorine. They are usually obtained as white, crystalline solids, having relatively high melting points, and being water-soluble.

The compounds of the present invention have been found, by standard methods of pharmacological evaluation, to be practically free from pressor effects (i.e. do not exhibit vasoconstricting activity) and to exhibit valuable bronchodilator effects, e.g. they neutralize the effect of bronchospasms of dogs treated with histamine. The tests indicate that these compounds have a minimum of side reaction, e.g. they do not exhibit central nervous system stimulation like ephedrine, or cause a rise in blood pressure as epinephrine, or heart palpitation and depressor effects as 3,4-hydroxy phenyl beta hydroxy ethyl isopropylamine (Isuprel) or have a deleterious effect on the heart, or cause any drowsiness. They are, however, effective against induced bronchial asthma in dogs treated with histamines when given intraduodenally. The compounds appear to be stable in the animal body and to be rapidly absorbed from the intestinal tract. In view of the foregoing it might be expected that these compounds would be effective where administered orally, in the management of asthma.

The utility as bronchodilators is limited to the compounds of the present invention. The p-chloro-isomer produces bronchodilation also, but it exhibits tachyphylaxis i.e. on repeated administration its bronchodilator effect gets weaker and increasingly larger amounts must be given to obtain the same level of bronchodilator effect. The p-bromo-isomer has a very weak and short-acting bronchodilator effect and cannot be considered useful as a bronchodilator agent. The meta-halo-isomers of the compounds of the invention have no bronchodilator activity. Replacement of the N,N-dimethyl group by its higher homologs e.g. N,N-diethyl and dibutyl, results in compounds offering no protection against the pulmonary effects of histamine i.e. having practically no bronchodilator effect. The bridge between the o-halo-phenyl group and the tertiary amino nitrogen atom must be a straight chain ethylene group, since substitution by a side chain or the use of a propylene bridging group appears to destroy the bronchodilator potency. It will thus be seen that the isomers and homologs of the non-toxic acid addition salts of the present invention do not have the bronchodilator utility which the claimed compounds have.

The acid addition salts of the present invention are prepared from the appropriate free bases by treating the latter with an appropriate acid, i.e. a mineral acid such as HCl, HBr, HI, HNO₃ H₃PO₄, H₂SO₄, et cetera, or with an organic acid such as acetic, citric, tartaric or lactic acid, et cetera, giving the hydrochloride, hydrobromide, hydroiodide, nitrate, phosphate or acid phosphate, sulfate or bisulfate, acetate, citrate or acid citrate, tartrate or bitartrate, and lactate salts, respectively.

The o-halo-N,N-dimethylphenethylamines, which are the free bases of the acid addition salts of the present invention may be prepared by reduction of the appropriate o-halophenylacetonitrile to a primary amine, followed by reductive alkylation to the tertiary amine. Reduction of the nitrile is effected in known manner, as by catalytic hydrogenation, or reduction with lithium aluminum hydride, the latter being preferred. The di-methyl tertiary amine is prepared by subjecting the primary amine to reductive alkylation using formaldehyde and formic acid. The acid addition salt is then formed by treating the free base with the appropriate acid in ether solution and then recrystallizing the product from an appropriate solvent e.g. ethanolether.

The following examples illustrate procedures whereby the compounds of the present invention may be prepared, but are not to be construed as limiting.

PREPARATIONS

*Preparation 1.—o-Chlorophenylacetonitrile*

A solution of 500 grams (3.1 moles) of commercial alpha-o-dichlorotoluene in 600 milliliters of ethanol was added during a period of 2 hours to a hot, stirred solution of 260 grams (4 moles) of potassium cyanide in 300 milliliters of water. After the mixture had been stirred under reflux for 5 hours it was distilled to remove most of the alcohol, and water was added to the residue. The insoluble oil was extracted with chloroform and distilled. Yield, 437 grams (88 percent); boiling point 106–111 degrees centigrade (2 millimeters). It is a known compound (J. Chem. Soc. 1948, 1251).

*Preparation 2.—o-Chlorophenethylamine*

A solution of 45.5 grams (0.3 mole) of the nitrile of Preparation 1 in 500 milliliters of methanol, previously saturated with ammonia at 10 degrees centigrade, was hydrogenated at 70 degrees centigrade under an initial hydrogen pressure of 1000 p.s.i. using Raney nickel (org. synthesis 21, 15) as the catalyst. After the absorption of hydrogen had ceased (3 hours), the cooled mixture was filtered, and the filtrate was distilled to remove the ammonia and methanol. The residual oil was taken up in dilute hydrochloric acid, and the insoluble material was extracted with ether. The aqueous solution was then made strongly alkaline, and the liberated oily base was extracted with ether. The ether solution was dried and distilled. Yield, 32 grams (69 percent); boiling point 77–80 degrees centigrade (0.8 millimeters).

*Analysis.*—Calculated for $C_8H_{10}ClN$: Neut. equiv., 156. Found: 156.

*Preparation 3.—o-Bromophenylacetonitrile*

A solution of 112 grams (0.7 mole) of bromine in 100 milliliters of carbon tetrachloride was added to a refluxing solution of 120 grams (0.7 mole) of commercial o-bromotoluene in 100 milliliters of carbon tetrachloride which was illuminated by a sunlamp. The removal of the solvent left a crude oily dibromo compound which was not purified but converted directly into the nitrile by adding 49 grams (1 mole) of sodium cyanide, 50 milliliters of water and 250 milliliters of ethanol and refluxing for 6 hours. The mixture was filtered, the filtrate was distilled to an oil residue which was partitioned between water and ether. The ether solution was dried and distilled to obtain 88 grams (50 percent) of o-bromophenylacetonitrile, boiling point 114–116 degrees centigrade (1.5 millimeters). It is reported to boil at 145–147 degrees centigrade (13 millimeters) in Beilstein IX (181).

*Preparation 4.—o-Bromophenethylamine*

The nitrile of Preparation 3 (48.8 grams, 0.25 mole) was hydrogenated in the same manner as the corresponding o-chloro compound of Preparation 2. The yield of o-bromophenethylamine material, boiling point 89–91 degrees centigrade (0.7 millimeter), was 15 grams (30 percent). It is a colorless liquid.

*Analysis.*—Calculated for $C_8H_{10}BrN$: Neut. equiv., 200. Found: 198.

EXAMPLES

EXAMPLE 1.—o-CHLORO-N,N-DIMETHYLPHENETHYLAMINE HYDROCHLORIDE

A mixture of 15.6 grams (0.1 mole) of the primary amine o-chlorophenethylamine from Preparation 2, 18.8 grams (0.23 mole) of 37 percent formaldehyde solution and 25.5 grams (0.4 mole) of 90 percent formic acid was refluxed for 10 hours. The excess formic acid was removed by vacuum distillation, the residual oil was dissolved in water, and the solution was made alkaline with sodium hydroxide. The liberated oily base was extracted with ether, the ether solution was dried and distilled to yield 13.3 grams (72 percent) of o-chloro-N,N-dimethylphenethylamine as a colorless liquid, boiling point 70–72 degrees centigrade (1 millimeter).

*Analysis.*—Calculated for $C_{10}H_{14}ClN$: Neut. equiv., 184. Found: 187.

o-Chloro-N,N - dimethylphenethylamine hydrochloride was prepared from the above free base and hydrogen chloride in ether and recrystallized from ethanol-ether as a white, crystalline solid, soluble in water; melting point 168–169 degrees centigrade.

*Analysis.*—Calculated for $C_{10}H_{14}ClN.HCl$: Cl, 16.11. Found: 16.12.

o-Chloro - N,N - dimethylphenethylamine hydroiodide may be prepared by contacting the above free base and hydrogen iodide in ether, and recrystallized from ethanol-ether as a white crystalline solid.

EXAMPLE 2.—o-BROMO-N,N-DIMETHYLPHENETHYLAMINE HYDROCHLORIDE

Reductive alkylation of 13.5 grams (0.068 mole) of the primary amine of o-bromophenethylamine with formaldehyde and formic acid as described in the method of preparation of Example 1 yielded 12.8 grams (79 percent) of o-bromo-N,N-dimethylphenethylamine as a colorless liquid, boiling point 75–77 degrees centigrade (0.6 millimeters).

*Analysis.*—Calculated for $C_{10}H_{14}BrN$: Neut. equiv., 228. Found: 232.

o-Bromo-N,N - dimethylphenethylamine hydrochloride was prepared from the base (above) (2 grams) and hydrogen chloride in ether solution and recrystallized from ethanol-ether. It is a white crystalline solid, readily soluble in water. Yield, 2 grams (86 percent); melting point 202–203 degrees centigrade.

*Analysis.*—Calculated for $C_{10}H_{14}BrN.HCl$: Cl, 13.40. Found: 13.32.

Following the above procedures, but using other acids in place of hydrogen chloride, any other desired pharmaceutically acceptable acid addition salt may be prepared. Also, it is possible to prepare different acid addition salts by known ion exchange methods.

Of the compounds of the present invention, the preferred compound is the compound of Example 2, o-bromo-N,N-dimethylphenethylamine hydrochloride, and its activity is illustrative of the activity of the other compounds. It induces an effective and long lasting protection of the lungs against histamine induced bronchospasm, with a minimum of cardiovascular involvement. It has little or no central effects as indicated by lack of motor stimulant and appetite depressant effects. Its toxicity is very low, and dogs have tolerated repeated intravenous injections of 5 milligrams per kilogram of body weight twice daily for long periods of time. Changes in heart rate, pupil size, behavior and muscle tone were very similar to those seen after amphetamine and they lasted only a few minutes. EKG changes were minimal and, if present, reverted to normal within a few minutes. Urine and blood counts remained normal. It has been administered orally to dogs in dosages of 100 milligrams per kilogram per day for four weeks and to rats at 250 milligrams per kilogram per day for seven weeks, and no signs of drug effect were observed in body weight, hematology, urinalysis, gross appearance and behavior. Its protective effect against histamine induced bronchospasm was evaluated in dogs anesthetized with barbital sodium and immobilized with Flaxedil. Pulmonary resistance was measured according to the method of Konzett and Rossler (Arch. Exp. Path. u. Pharm. 195, 71, 1950). The drugs were injected intravenously as saline solutions. EKG was taken routinely. The response to intravenously administered histamine (5–15 mcg./kg.) was checked before and at specified intervals after drug administration. Epinephrine was administered intravenously (0.5 to 3.0 mcg./kg.) before and at random intervals after drug administration as a control for both pressor potency and for protection against histamine-induced bronchospasm.

In such an experiment, the compound of Example 2 injected intravenously at a dose of 5 mg./kg. produced a slight increase in blood pressure (short lasting) while the protective effect against histamine induced bronchospasm was still noticeable 30 minutes after the injection. In comparison, an intravenous injection of 3 mcgm./kg. of epinephrine produced a pressor response at least twice as much while the protection against histamine induced bronchospasm had completely disappeared within 15 minutes. Smaller doses of the Example 2 compound could produce a protective effect as great as smaller doses of epinephrine without inducing any pressor changes. Furthermore, the heart rate invariably increased after epinephrine while the Example 2 compound caused only a very short lasting and very mild tachycardia followed by a somewhat longer lasting very mild bradycardia.

The oral efficacy of the Example 2 compound was established by intraduodenal administration in an anesthetized dog. A dose of 20 mg./kg. produced an effective blockade of the pulmonary response to histamine. This effect reached its maximum within 5 to 15 minutes and gradually declined over the following 20 to 25 minutes. During this time there were no significant changes in blood pressure or heart rate. In contrast, a similar dose of ephedrine administered into the duodenum did not protect against histamine while blood pressure rose significantly accompanied by small increase in heart rate.

Various modifications, apparent to those skilled in the art, may be made in the compounds shown and described without departing from the spirit or scope of the present invention, and it is to be understood that we limit ourselves only as defined in the appended claims.

We claim:

The process of producing bronchodilator effects in the animal organism which comprises the administration therein of dosage units of a non-toxic, pharmaceutically acceptable, acid addition salt of o-halo-N,N-dimethylphenethylamine.

References Cited in the file of this patent

FOREIGN PATENTS

| | | |
|---|---|---|
| 307,305 | Great Britain | June 4, 1930 |
| 488,303 | Canada | Nov. 18, 1952 |

OTHER REFERENCES

Bryant et al., Journal of the American Chemical Society, vol. 76, pages 3972 and 3973 (1954).

Hey et al., Journal of the American Chemical Society (1951), page 1529.

Patrick et al., Journal of the American Chemical Society, vol. 68, page 1010 relied on (June 1946).

Buck et al., Journal of the American Chemical Society, vol. 66, page 311 (February 1944).

Johns et al., Journal of the American Chemical Society, vol. 60, pages 919 and 920, April 1938.

Goss, Journal of the American Chemical Society (1927), page 256.